US008679213B2

(12) United States Patent
Lu et al.

(10) Patent No.: US 8,679,213 B2
(45) Date of Patent: Mar. 25, 2014

(54) DUST COLLECTOR

(75) Inventors: Chin Hsiu Lu, Taichung (TW); Chin Ming Wang, Taichung (TW)

(73) Assignee: Rexchip Electronics Corporation, Taichung (TW)

( * ) Notice: Subject to any disclaimer, the term of this patent is extended or adjusted under 35 U.S.C. 154(b) by 231 days.

(21) Appl. No.: 13/282,905

(22) Filed: Oct. 27, 2011

(65) Prior Publication Data

US 2013/0104507 A1    May 2, 2013

(51) Int. Cl.
*B01D 45/00*    (2006.01)
(52) U.S. Cl.
USPC .................... 55/446; 55/443; 55/444; 55/445
(58) Field of Classification Search
USPC .................................................. 55/442–446
See application file for complete search history.

(56) References Cited

U.S. PATENT DOCUMENTS 4,098,594 A * 7/1978 Shorr et al. ...................... 55/403
5,423,429 A * 6/1995 Hawthorne ................... 209/156

* cited by examiner

*Primary Examiner* — Dung H Bui
(74) *Attorney, Agent, or Firm* — Muncy, Geissler, Olds & Lowe, P.C.

(57) ABSTRACT

A dust collector for catching dust generated by temperature drop comprises a box, a plurality of separating boards, a plurality of catch boards, and a plurality of baffle boards. The separating boards partition the box to form an air flow channel. The catch boards and the baffle boards are staggered in the air flow channel; a portion of the catch boards are arranged in a central column to form a superimposition region along the vertical direction. The pores of the catch boards in the superimposition region are overlapped to make the air flow pour into the air flow channel easily. The baffle boards are staggered at the left or right of the catch boards, whereby the air flow takes more time to have a longer travel in the air flow channel, and dust is not accumulated in a single area but uniformly caught by the catch boards.

8 Claims, 11 Drawing Sheets

DUST COLLECTOR

FIELD OF THE INVENTION

The present invention relates to a waste gas processing device for the CVD process, particularly to a dust collector collecting dust in waste gas.

BACKGROUND OF THE INVENTION

The chemical vapor deposition (CVD)method is a film forming process frequently used in the semiconductor industry, wherein a liquid material is heated into a vapor reacting with special gases, and wherein the product then contacts and deposits on specified areas to form a film.

A considerable amount of waste gas is generated by the CVD process and needs processing by a detoxifier before exhaust. After cooling down, the waste gas will condense into corrosive dust. In order to avoid dust pollution and reduce the burden of the detoxifier, the dust is filtered beforehand.

Refer to FIG. 1 for a conventional dust collector. In order to filter out dust, let waste gas pass through a conventional dust collector 1. The conventional dust collector 1 has an inlet 2 and an outlet 3. Some separating boards 4 are arranged behind the inlet 2 to reduce backpressure and enable waste gas to enter the dust collector 1. A plurality of filter boards 5 is densely arranged before the outlet 3 to catch the dust generated by temperature drop as much as possible.

Refer to FIG. 2 and FIG. 3. In the conventional dust collector 1, a plurality of catch boards 6 is arranged between the inlet 2 and the outlet 3. The catch boards 6 respectively have different-size pores 7A, 7B, 7C, and 7D, whose diameters positively correlate with the distances between the catch boards 6 and the outlet 3. In other words, the closer the catch board 6 to the outlet 3, the smaller the diameter of the pores 7A, 7B, 7C, or 7D. The number of the pores 7A, 7B, 7C or 7D of a catch board 6 positively correlates with the distance between the catch board 6 and the inlet 2. In other words, the closer the catch board 6 to the inlet 2, the smaller the number of the pores 7A, 7B, 7C, or 7 of the catch board 6. The catch boards 6 may be roughly divided into a first region 8A and a second region 8B, wherein the first region 8A is nearer to the inlet 2. FIG. 2 schematically shows an overlapped view of the catch boards 6 in the first region 8A, wherein the pores 6A and 6B are larger. FIG. 3 schematically shows an overlapped view of the catch boards 6 in the second region 8B, wherein the pores 6C and 6D are obviously smaller.

Thereby, the dust carried by an air flow 9 will be caught by and deposits on the pores 7A, 7B, 7C, and 7D of the catch boards 6 after it enters the dust collector 1. Thus is reduced the burden of the waste gas processor.

However, the pores 7A, 7B, 7C, and 7D of the catch boards 6 overlap. Therefore, the dust of the waste gas can easily pass through the pores 7A, 7B, 7C, and 7D, and the waste gas only stays in the dust collector 5 for a short time. In fact, the pores 7A, 7B, 7C, and 7D can only catch a limited amount of dust, and most of the dust is accumulated on the filter boards 5. Thus is obviously decreased the service life of the dust collector 1. Consequently, the dust collector 1 needs cleaning and replacing frequently. Thus is prolonged the maintenance downtime, decreased the productivity, and increased the fabrication cost.

SUMMARY OF THE INVENTION

The primary objective of the present invention is to provide a dust collector, which does not collect dust in a single area but can uniformly catch dust, whereby is prolonged the service life of the dust collector.

To achieve the abovementioned objective, the present invention proposes a dust collector, which is used to catch dust in air flow, and which comprises a box, a plurality of separating boards, a plurality of catch boards, and a plurality of baffle boards, wherein the separating boards form an air flow channel in the box. The air flow channel has an inlet and an outlet. The air flow channel is divided into an incoming region, a first catch region, a second catch region, and an outgoing region. The catch boards are arranged in the air flow channel and each has a plurality of pores. Each of the catch boards in the first catch region, the second catch region and the outgoing region has pores whose diameters positively correlates with the distance between the catch board and the outlet and whose number positively correlates with the distance between the catch board and the inlet.

The baffle boards are arranged in the incoming region. The baffle boards and the catch boards are arranged in rows. In the incoming region, the catch boards are staggered with respect to the baffle boards; a portion of the catch boards are arranged in a central column to form a superimposition region along the vertical direction. The pores of the catch boards in the superimposition region are overlapped.

The overlapped pores in the superimposition region can reduce backpressure and make the air flow easily pour into the air flow channel. The baffle boards can increase the area that the air flow contacts the catch boards and the time that the air flow stays in the air flow channel, whereby the catch boards can catch dust more efficiently and uniformly, and whereby dust is deposited on the catch boards uniformly. Therefore, the present invention can prolong the service life of the dust collector, decrease the frequency of replacement and reduce the cost of cleaning and maintenance.

DETAILED DESCRIPTION OF THE PREFERRED EMBODIMENTS

Figure 1:
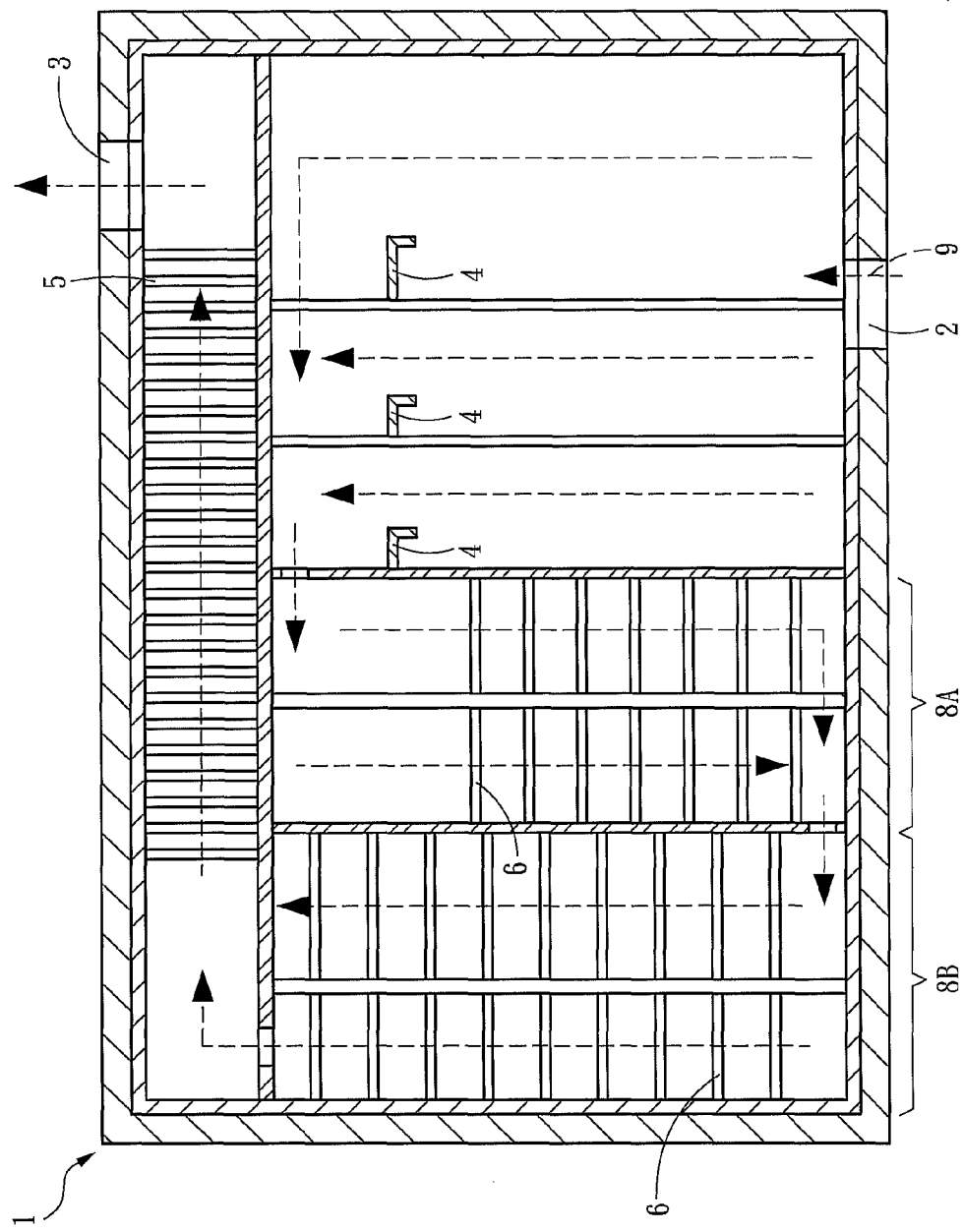
FIG. 1 schematically shows the structure of a conventional dust collector.
Figure 2:
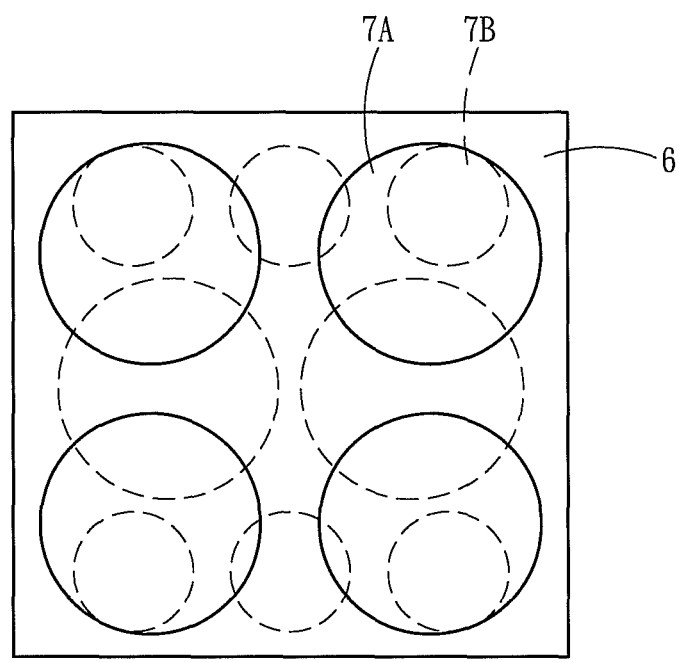
FIG. 2 is an overlapped view of the catch boards of a conventional dust collector.
Figure 3:
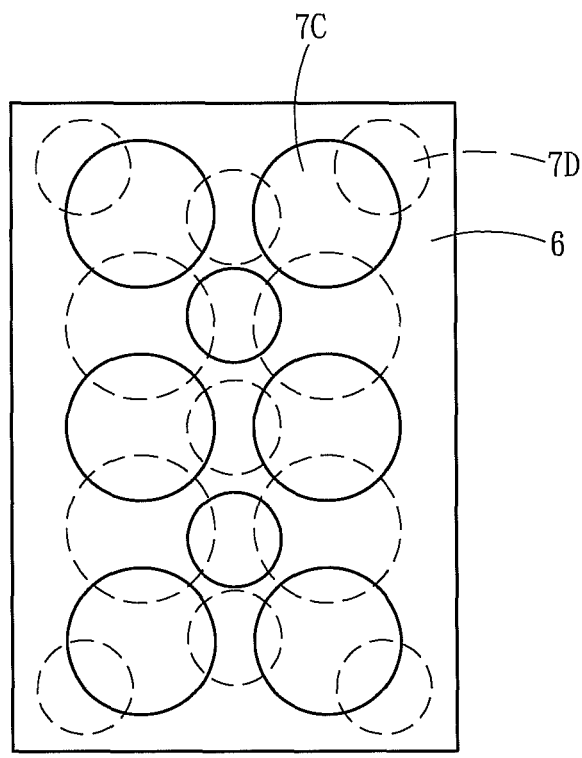
FIG. 3 is another overlapped view of the catch boards of a conventional dust collector.
Figure 4:
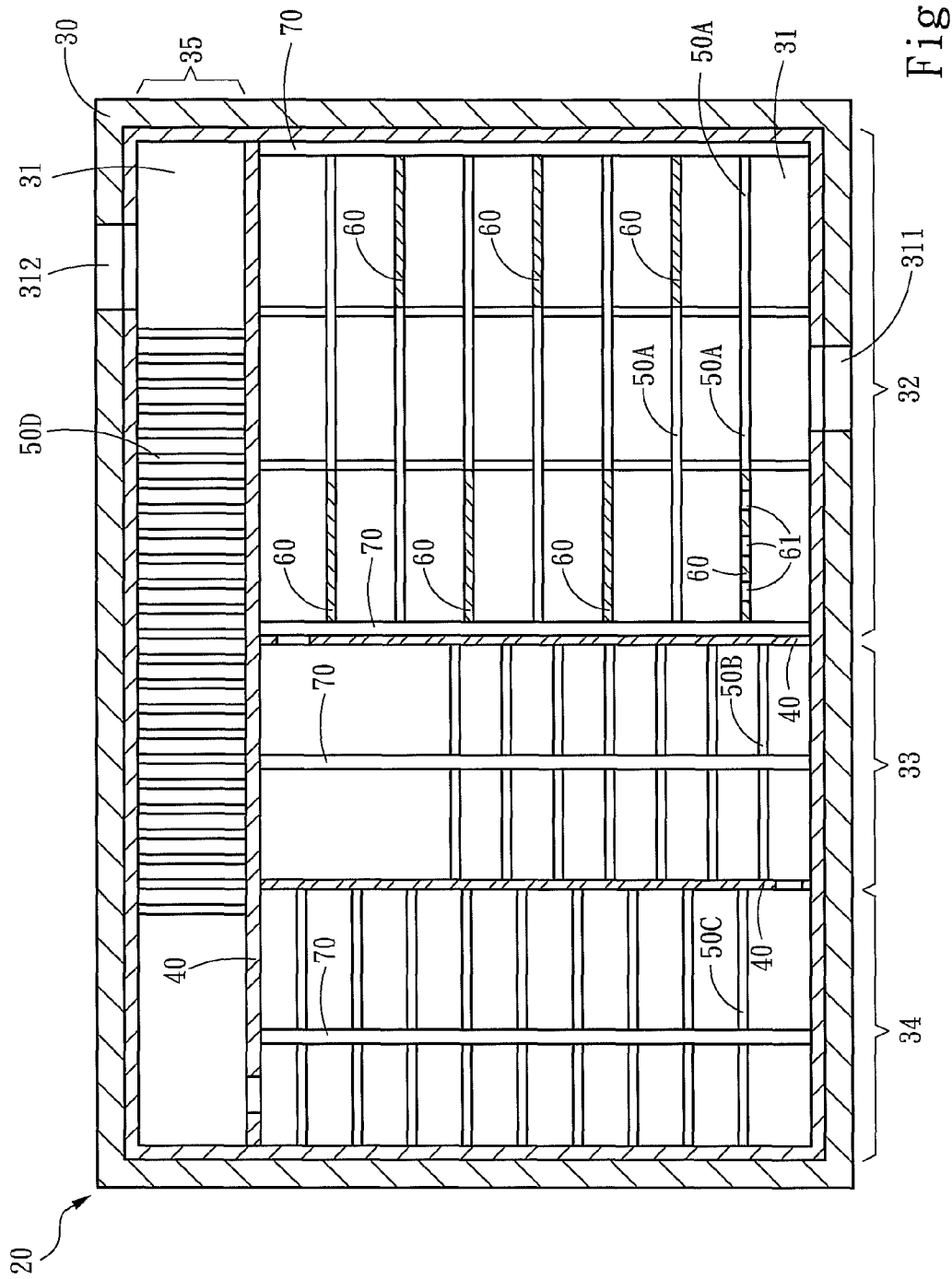
FIG. 4 schematically shows the structure of a dust collector according to one embodiment of the present invention.

The embodiments are used to demonstrate the present invention below.

Refer to FIGS. 4-9. The dust collector 20 of the present invention is used to catch dust in an air flow 10 (as shown in FIG. 10) and comprises a box 30, a plurality of separating boards 40, a plurality of catch boards 50A, 50B, 50C, and 50D, and a plurality of baffle boards 60. The separating boards 40 partitions the box 30 to form an air flow channel 31. The air flow channel 31 has an inlet 311 and an outlet 312. The air flow channel 31 is divided into an incoming region 32, a first catch region 33, a second catch region 34, and an outgoing region 35.

The catch boards 50A, 50B, 50C and 50D are arranged in the air flow channel 31 and respectively have a plurality of pores 51A, 51B, 51C and 51D. The catch board boards 50B, 50C and 50D are respectively arranged in the first catch region 33, the second catch region 34 and the outgoing region 35. The pores 51B, 51C or 51D of each of the catch board boards 50 (50B, 50C and 50D) has a diameter positively correlating with the distance between the catch board 50 and the outlet 312. In other words, the closer the catch board 50B, 50C or 50D D to the outlet 312, the smaller the diameter of the pores 51B, 51C or 51D. The distance is the length measured along the air flow channel 31. The number of the pores 51B, 51C or 51D of a catch board 50 (50B, 50C or 50D) positively correlates with the distance between the catch board 50 and the inlet 311. In other words, the closer the catch board 50B, 50C or 50D to the inlet 311, the smaller the number of the pores 51B, 51C or 51D of the catch board 50B, 50C or 50D.

Figure 5:
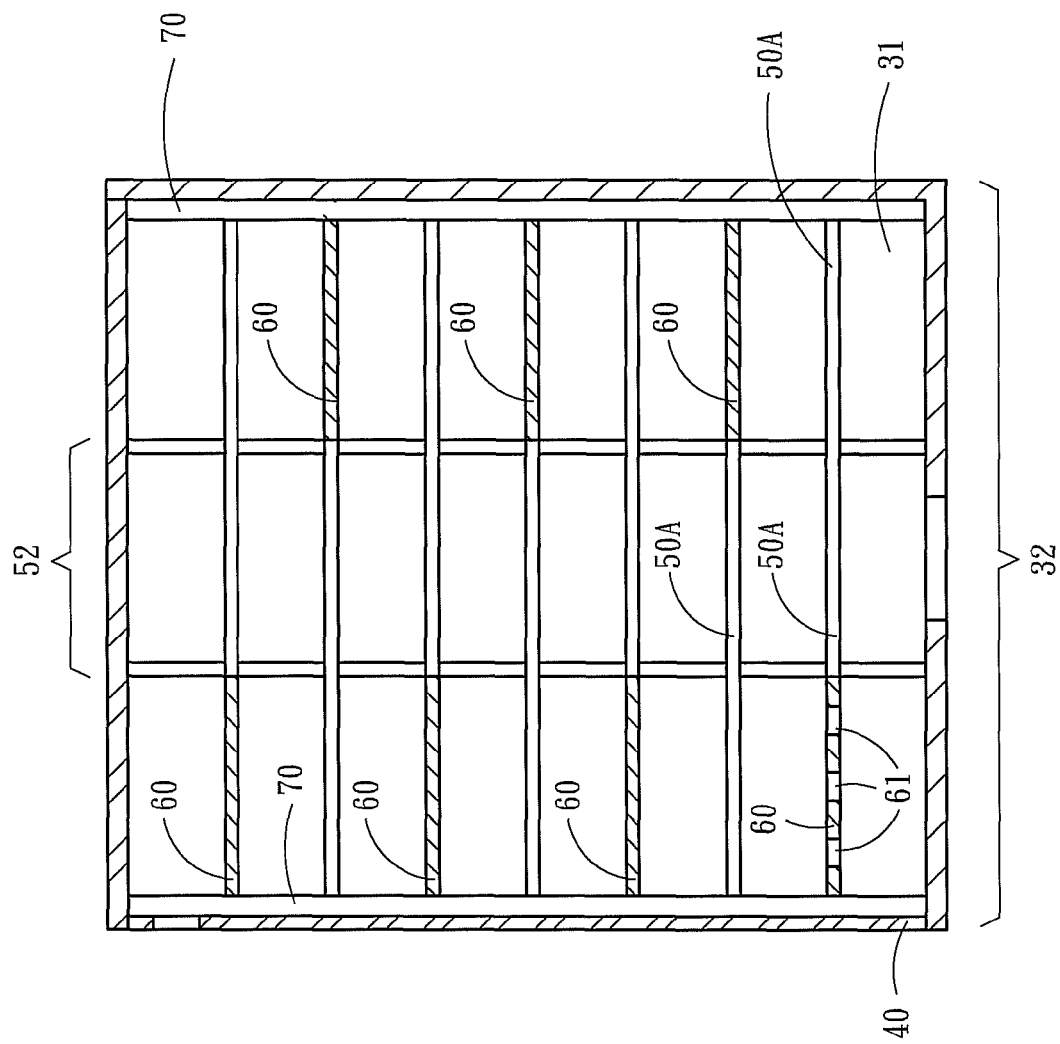
FIG. 5 schematically shows a superimposition region of a dust collector according to one embodiment of the present invention.
Figure 6:
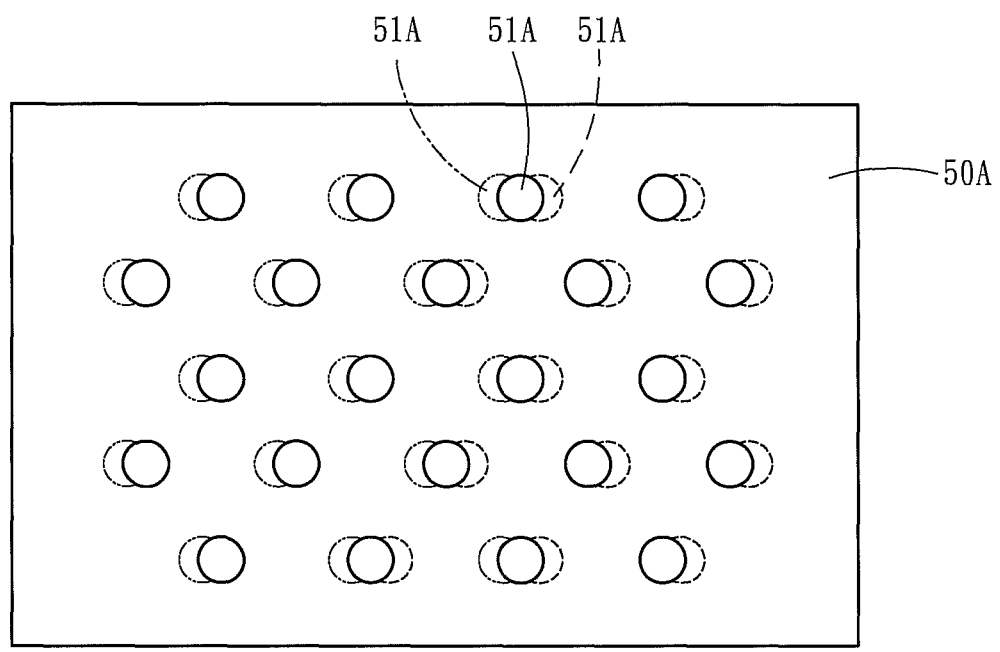
FIG. 6 is a first overlapped view of the catch boards of a dust collector according to one embodiment of the present invention.

The baffle boards 60 are arranged in the incoming region 32 and aligned in rows with the catch boards 50A. In the incoming region 32, a portion of the catch boards 50A are arranged in a central column to form a superimposition region 52 along the vertical direction (as shown in FIG. 5), and the baffle board 60 is arranged in the left or right of the superimposition region 52 in each row. In the superimposition region 52, the pores 51A of the catch boards 50A in different rows overlap and have superimposed areas. As shown in FIG. 6, every three pores 51A overlap. The baffle board 60, which is nearest to the inlet 311, has a plurality of pores 61, to improve air flowing lest dust block the incoming region 32.

In one embodiment, the catch board 50A in the incoming region 32 is preferred to have a length of 239.5-240.5 mm and a width of 131.5-132.5 mm; the pore 51A is preferred to have a diameter of 14.8-15.2 mm.

In one embodiment, the dust collector 20 of the present invention further comprises a plurality of fixing rods 70 penetrating the baffle boards 60 and the catch boards 50A, 50B and 50C to fix them lest air pressure displace them.

Figure 7:
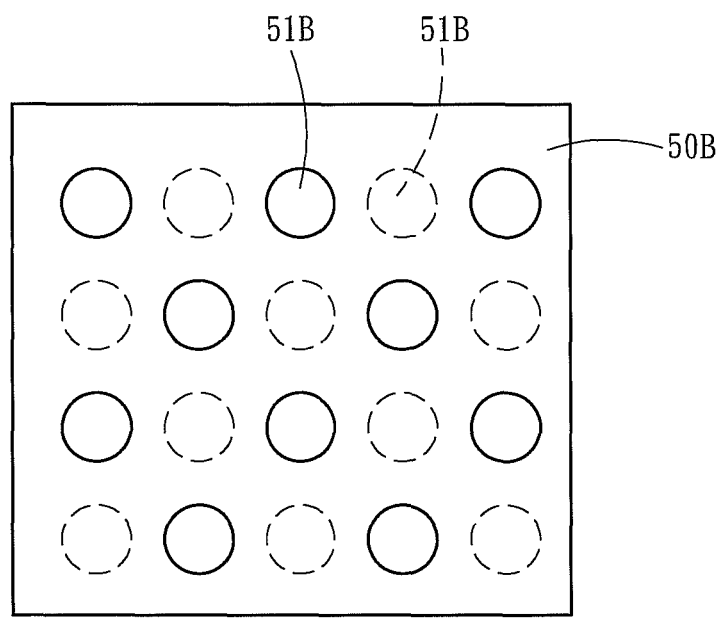
FIG. 7 is a second overlapped view of the catch boards of a dust collector according to one embodiment of the present invention.
Figure 8:
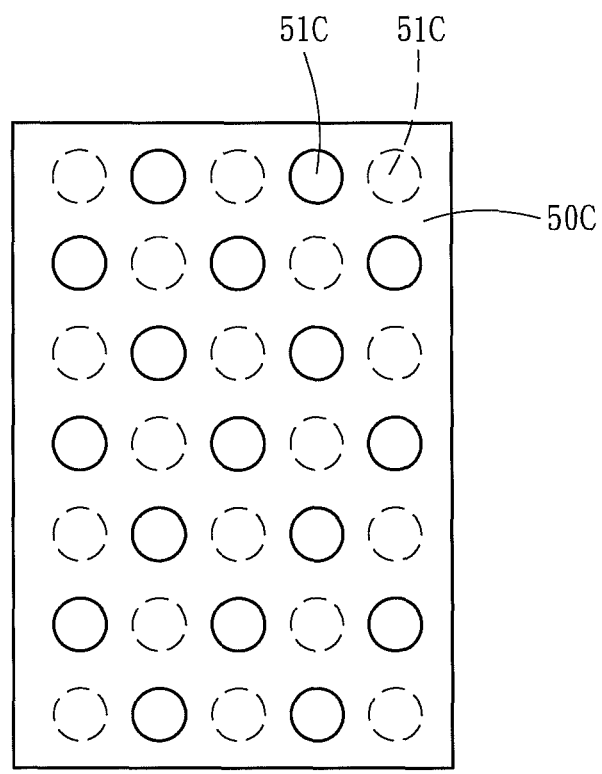
FIG. 8 is a third overlapped view of the catch boards of a dust collector according to one embodiment of the present invention.
Figure 9:
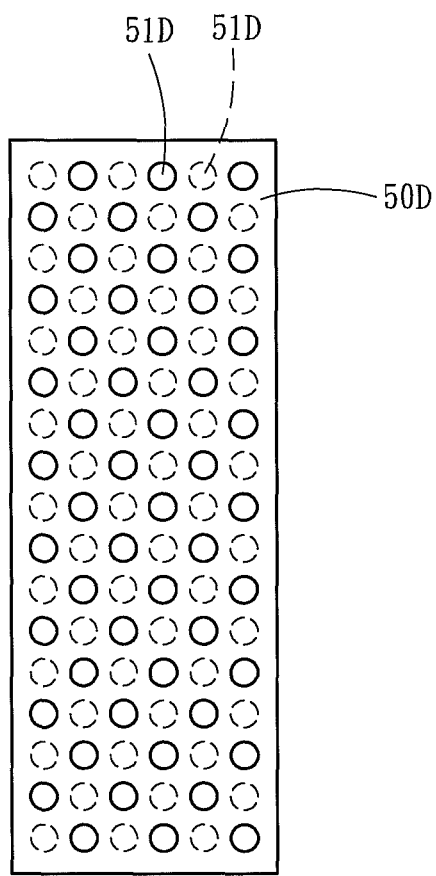
FIG. 9 is a fourth overlapped view of the catch boards of a dust collector according to one embodiment of the present invention.
Figure 10:
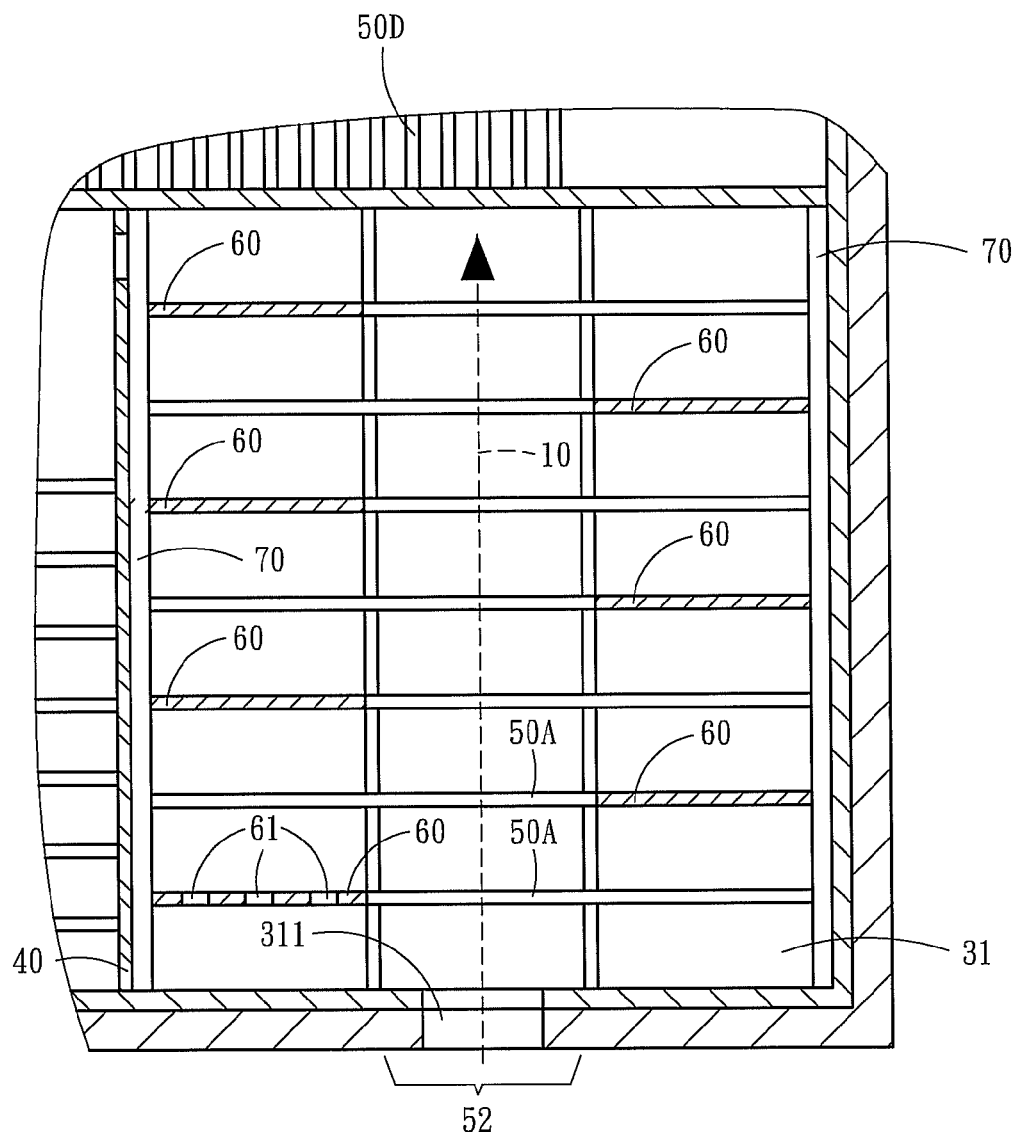
FIG. 10 is a first diagram schematically showing the directions of an air flow in a dust collector according to one embodiment of the present invention.

Refer to FIGS. 7-9 for the overlapped views of the pores 51B, 51C and 51D of the catch board boards 50B, 50C and 50D. The pores 51B of one catch board 50B in the first catch region 33 are arranged to not overlap the pores 51B of another catch board 50B. For the catch boards 50C in the second catch region 34, the arrangement of the pores 51C is similar to that of the pores 51B. Therefore, the air flow 10 would not pass through the pores 51B and 51C directly but will take more time to have a longer travel in the catch boards 50B and 50C. Thus is more dust caught by the catch boards 50B and 50C.

In one embodiment, the catch board 50B in the first catch region 33 is preferred to have a length of 155.5-156.5 mm and a width of 149.5-150.5 mm; the pore 51B is preferred to have a diameter of 19.8-20.2 mm. In one embodiment, the catch board 50C in the second catch region 34 is preferred to have a length of 151.5-152.5 mm and a width of 90.8-91.2 mm; the pore 51C is preferred to have a diameter of 14.8-15.2 mm. In one embodiment, the catch board 50D in the outgoing region 35 is preferred to have a length of 151.5-152.5 mm and a width of 49.8-50.2 mm; the pore 51D is preferred to have a diameter of 9.8-10.2 mm. The pores 51D of the catch board 50D in the outgoing region 35 are distributed in the highest density.

Figure 11:
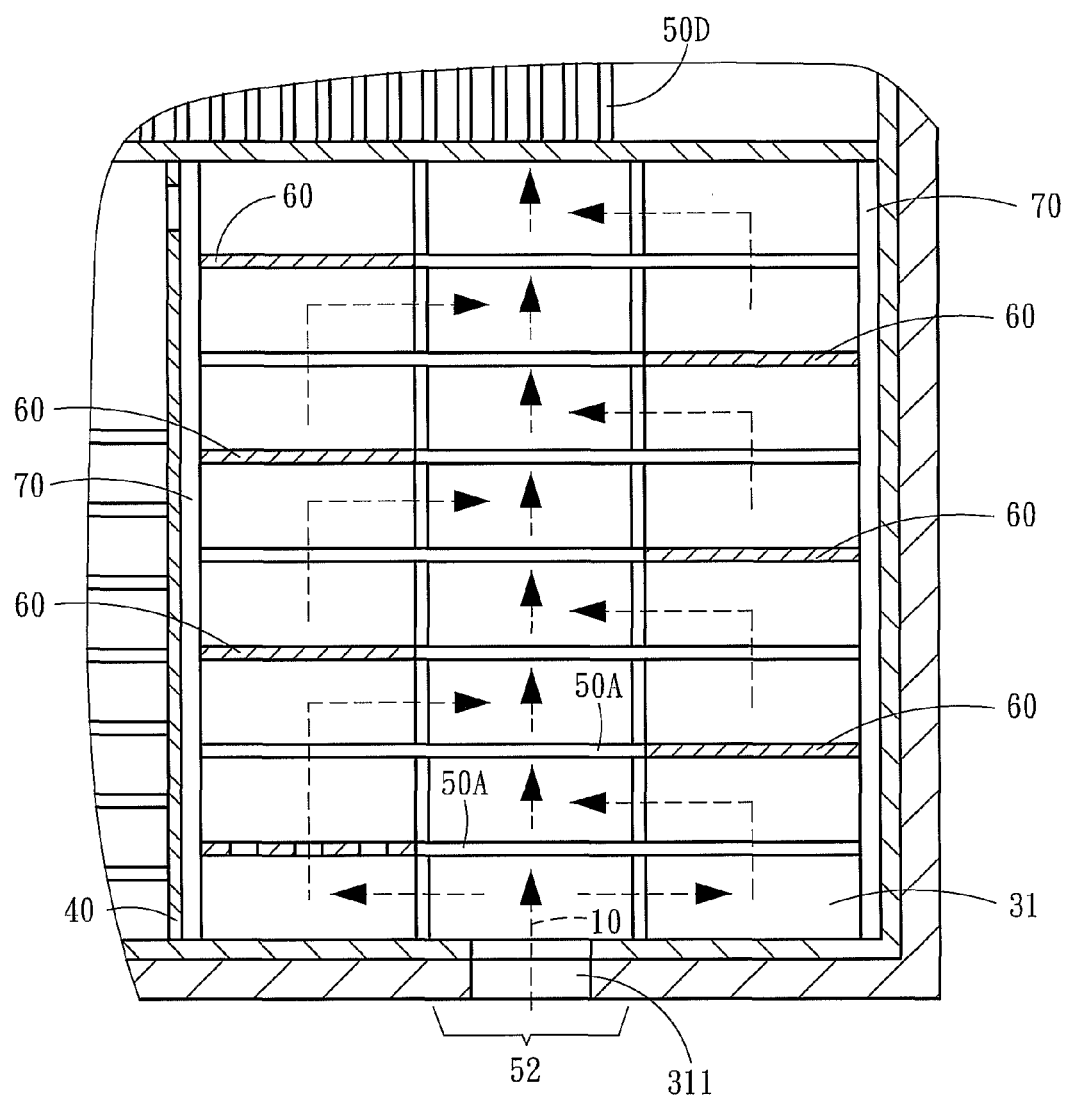
FIG. 11 is a second diagram schematically showing the directions of an air flow in a dust collector according to one embodiment of the present invention.

Refer to FIG. 10 and FIG. 11 schematically showing that all the regions of the dust collector can uniformly collect dust. At beginning, the air flow 10 carrying dust can easily pour into the air flow channel 31 via the superimposition region 52 and takes most of the dust to the deep of the air flow channel 31, whereby dust would not accumulate massively in the incoming region 32. When the air flow 10 runs through the incoming region 32 and the superimposition region 52, dust deposits gradually, and the flow velocity decreases. At this time, the catch boards 50A at two sides of the superimposition region 52 also allow the air flow 10 to pour into the air flow channel 31 (as shown in FIG. 11) lest the flow velocity decrease abruptly and dust block the superimposition region 52 fast.

The present invention arranges the pores 51A of the catch boards 50A in the superimposition region 52 to overlap and make the air flow 10 pour into the air flow channel 31 easily. Further, the present invention uses the baffle boards 60 to realize the stagger arrangement of the catch boards 50A. Furthermore, the present invention also staggers the pores 51B, 51C and 51D of the catch boards 50B, 50C and 50D to increase the contact time and contact area of the air flow 10 and the catch boards 50B, 50C and 50D.

Thus, the catch boards 50A, 50B, 50C and 50D of the present invention can catch dust effectively and uniformly and make dust deposit on the boards 50A, 50B, 50C and 50D uniformly. Therefore, the present invention can prolong the service life of the dust collector 20, decrease the frequency of replacement, and reduce the cost of cleaning and maintenance.

What is claimed is:

1. A dust collector for catching dust in an air flow, comprising
    a box;
    a plurality of separating boards partitioning the box to form an air flow channel, wherein the air flow channel has an inlet and an outlet, and wherein the air flow channel is divided into an incoming region, a first catch region, a second catch region, and an outgoing region;
    a plurality of catch boards respectively being located in the air flow channel and having a plurality of pores, wherein diameter of the plurality of pores on the catch boards in the first catch region, the second catch region or the outgoing region positively correlates with distance between the catch boards and the outlet, and wherein number of the plurality of pores on the catch boards positively correlates with distance between the catch boards and the inlet; and
    a plurality of baffle boards arranged in the incoming region and aligned in rows and columns with the catch boards, wherein the incoming region has a superimposition region at a middle thereof along a direction from the inlet to the outlet, and wherein the plurality of pores of the catch boards in the superimposition region are overlapped.

2. The dust collector according to claim 1, wherein the baffle board nearest to the inlet has a plurality of pores.

3. The dust collector according to claim 1 further comprising a plurality of fixing rods penetrating and fixing the baffle boards and the catch boards.

4. The dust collector according to claim 1, wherein the pores of the catch boards respectively arranged in the first catch region and the second catch region are staggered.

5. The dust collector according to claim 4, wherein the catch boards arranged in the first catch region have a length of 155.5-156.5 mm and a width of 149.5-150.5 mm, and the pores thereof have a diameter of 19.8-20.2 mm.

6. The dust collector according to claim 4, wherein the catch boards arranged in the second catch region have a length of 151.5-152.5 mm and a width of 90.8-91.2 mm, and the pores thereof have a diameter of 14.8-15.2 mm.

7. The dust collector according to claim 1, wherein the catch boards arranged in the incoming region have a length of 239.5-240.5 mm and a width of 131.5-132.5 mm, and the pores thereof have a diameter of 14.8-15.2 mm.

8. The dust collector according to claim 1, wherein the catch boards arranged in the outgoing region have a length of 151.5-152.5 mm and a width of 49.8-50.2 mm, and the pores thereof have a diameter of 9.8-10.2 mm.

* * * * *